US009547172B2

United States Patent
Remillard et al.

(10) Patent No.: US 9,547,172 B2
(45) Date of Patent: Jan. 17, 2017

(54) VEHICLE IMAGE DISPLAY

(71) Applicant: Ford Global Technologies, LLC, Dearborn, MI (US)

(72) Inventors: Jeffrey Thomas Remillard, Ypsilanti, MI (US); Anthony Gerald King, Ann Arbor, MI (US); Jeff Allen Greenberg, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 14/512,575

(22) Filed: Oct. 13, 2014

(65) Prior Publication Data

US 2016/0103319 A1   Apr. 14, 2016

(51) Int. Cl.
*G09G 5/00* (2006.01)
*G02B 27/01* (2006.01)
*G06F 3/14* (2006.01)
*B60R 1/00* (2006.01)
*G09G 3/00* (2006.01)

(52) U.S. Cl.
CPC ............... *G02B 27/01* (2013.01); *B60R 1/00* (2013.01); *G06F 3/1423* (2013.01); *G09G 3/002* (2013.01); *G09G 3/003* (2013.01); *B60R 2300/205* (2013.01); *G09G 2340/14* (2013.01); *G09G 2380/10* (2013.01)

(58) Field of Classification Search
CPC ............ G09G 2300/026; G06F 3/1446; G02F 1/133362
USPC .......................................... 345/1.1–1.3, 7–9
See application file for complete search history.

(56) References Cited

U.S. PATENT DOCUMENTS

| 5,278,532 A | 1/1994 | Hegg et al. |
| 5,440,428 A | 8/1995 | Hegg et al. |
| 5,731,903 A | 3/1998 | Cook |
| 7,180,408 B2 | 2/2007 | Sonobe |
| 2009/0085368 A1* | 4/2009 | Coffelt .................. B60K 35/00 296/70 |
| 2013/0021224 A1* | 1/2013 | Fujikawa ........... G02B 27/0101 345/7 |
| 2014/0285398 A1* | 9/2014 | Ueda ........................ G09G 5/14 345/1.1 |
| 2015/0066360 A1* | 3/2015 | Kirsch ............... G01C 21/3688 701/438 |

FOREIGN PATENT DOCUMENTS

EP   0431488 A2   6/1991

OTHER PUBLICATIONS

"Multi-Purpose Virtual Image Display", www.saabgroup.com, Jan. 1, 2009, 2 pages.

* cited by examiner

*Primary Examiner* — Kimnhung Nguyen
(74) *Attorney, Agent, or Firm* — Frank MacKenzie; Bejin Bieneman PLC

(57) ABSTRACT

A heads up display system includes a computer that is programmed to receive data from one or more sources in a vehicle. The computer is further programmed to identify respective subsets of the data to be provided to respective ones of a plurality of display devices, and to provide the respective subsets of the data to the respective display devices.

20 Claims, 7 Drawing Sheets

VEHICLE IMAGE DISPLAY

BACKGROUND

Vehicle drivers can experience difficulty in changing a focus point from a roadway to a vehicle display, e.g., as a driver ages the time to change a focus point of the driver's eyes (the accommodation time) generally increases. An accommodation time becomes especially noticeable and bothersome when a driver needs to glance between the road and a vehicle instrument cluster. Moreover, for some drivers it may even become impossible to focus on an instrument cluster without using reading glasses or bi-focal glasses.

One solution to problems caused by accommodation time requirements has been to implement some type of heads-up-display (display device) that has the ability to form images that appear at some distance from the driver, thus reducing or substantially eliminating the accommodation time. Unfortunately, present display devices suffer from limitations in their abilities to display virtual images, both in a number of virtual images and in locations at which virtual images can be displayed in a vehicle.

DRAWINGS

DESCRIPTION

Introduction

Figure 1:
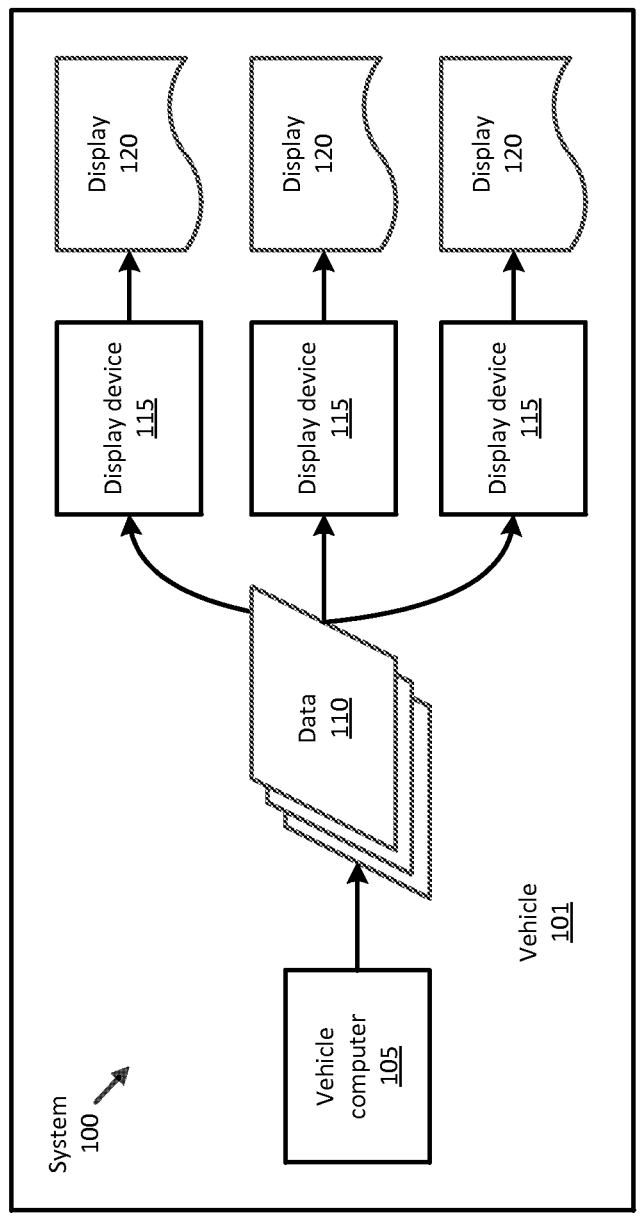
FIG. 1 is a block diagram of a heads-up-display system in a vehicle.

FIG. 1 is a block diagram of a heads-up-display (HUD) system 100 in a vehicle 101. The system 100 includes a vehicle computer 105 that provides data 110 to one or more display devices 115. Each of the display devices 115 can generate a display 120 that generally includes data 110 that the computer 105 has received from one or more components in the vehicle 101, such as data 110 relating to vehicle 101 speed, location, status of vehicle 101 systems, etc. The display devices 115 may be arranged to provide displays 120 at various locations on or with respect to the vehicle 101, such as on vehicle 101 pillars, on a vehicle 101 windscreen, hood, dashboard, etc.

System Overview

A vehicle 101 is typically a motor vehicle such as an automobile. The vehicle 101 computer 105 is included in the system 100 for carrying out various operations, including as described herein, and generally includes a processor and a memory, the memory including one or more forms of computer-readable media, and storing instructions executable by the processor for performing various operations, including as disclosed herein. Although one computer 105 is shown in FIG. 1 for ease of illustration, it is to be understood that the computer 105 could in fact, include, and various operations described herein could be carried out by, one or more computing devices, e.g., vehicle component controllers such as are known and/or a computing device dedicated to the system 100.

The memory of the computer 105 further generally stores data 110 received via various communications mechanisms from one or more sources in the vehicle 101; e.g., the computer 105 is generally configured for communications on a controller area network (CAN) bus or the like, and/or for using other wired or wireless protocols, e.g., Bluetooth, etc. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from various devices, e.g., controllers, actuators, sensors, etc. As mentioned above, data 110 may be received from various vehicle 101 components such as sensors and controllers and may include vehicle 101 speed, location, status of vehicle 101 systems such as engine temperature, RPMs, tire pressure, climate control, etc. Data 110 may also include still and/or moving images obtained from cameras inside and/or outside the vehicle 101.

A display device 115 in the context of the system 100 generally includes a liquid crystal display (LCD) panel and array of lenses to provide a display 120. An display device 115 that is so configured is generally dimensioned so that it can be positioned at various locations in the vehicle 101. An exemplary device for use as a display device 115 is described in International Patent Application PCT/US2014/028799 (publication no. WO 2014/144403 A2), filed Mar. 14, 2014, and entitled "Optical System for Head-up and Near-to-Eye Displays," which application is hereby incorporated herein by reference in its entirety.

Figure 2:
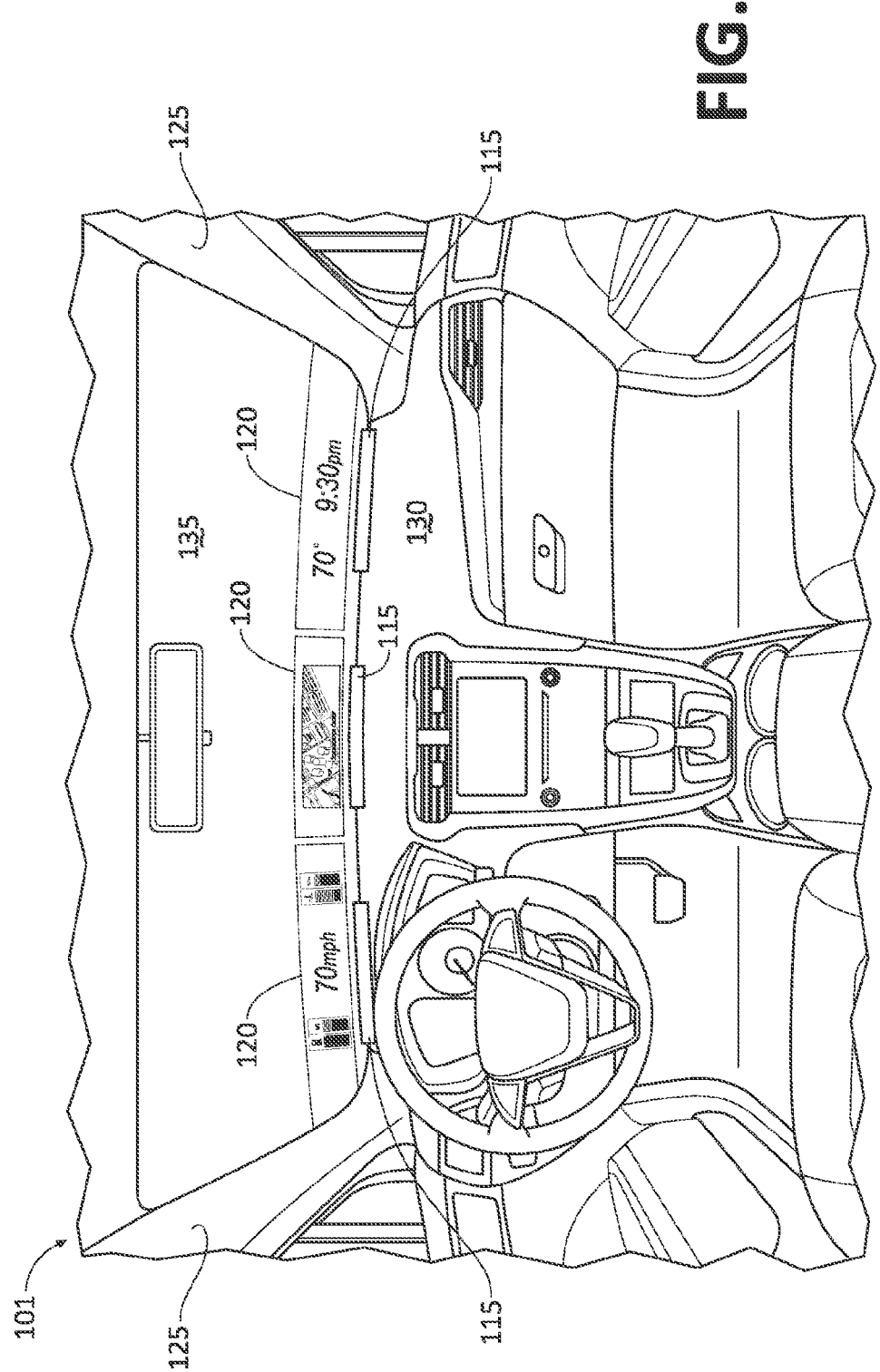
FIG. 2 is a perspective view of a front portion of a vehicle interior including an example of a plurality of heads-up displays provided on a vehicle windscreen.

As seen in FIGS. 2, 3, and 4, display devices 115 may be positioned at various locations with respect to a vehicle 101 dash panel (sometimes referred to as an "instrument panel") 130, or elsewhere in a vehicle 101, such as at or near a base of a pillar, on a steering column, etc. Further, the display devices 115 can provide respective displays 120 on a vehicle windscreen 135 as seen in FIG. 2. Advantageously, the displays 120 can be tiled to occupy substantially the entire horizontal width at or near a bottom portion of a windscreen 135.

As can be seen, different displays 120 in the system 100 can be used to provide different information and different types of information from the computer 105. For example, in FIG. 2, a first display 120, on the left-hand side of the windscreen 135 as faced by a vehicle 101 driver, may include vehicle status information such as current vehicle speed, fuel status, etc. A second display 120 to the right of the first display 120 may include navigational information. A third display 120 to the right of the second display 120 may provide environmental and/or more general information, e.g., an outside temperature, a time, etc. Note that other examples are possible, and although three displays 120 are shown tiled across a windscreen 135, it is possible that the displays 120 could be spaced or arranged in some other way, and that some other number of displays 120 could be included.

Figure 3A:
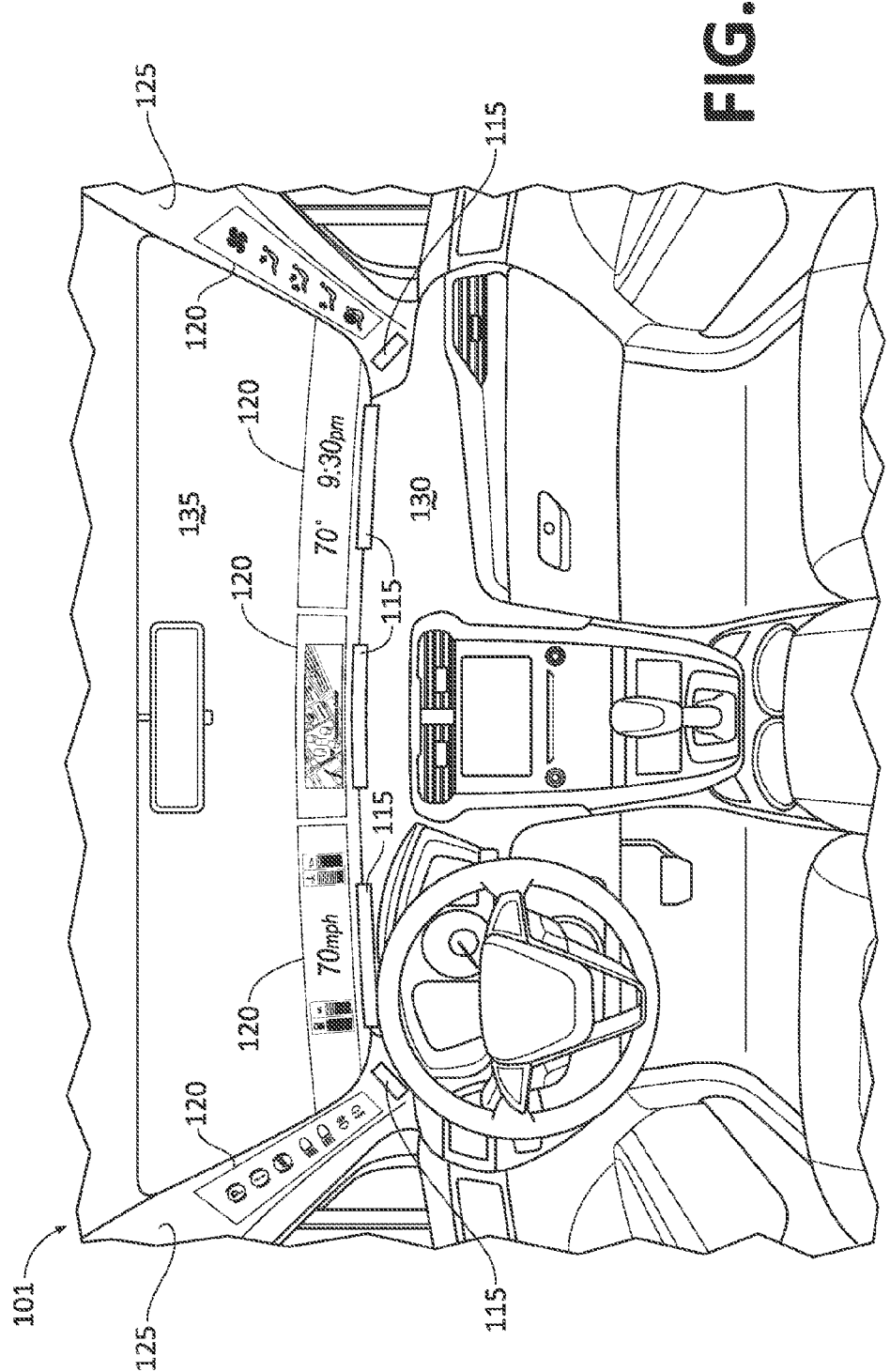
FIG. 3A is a perspective view of a front portion of a vehicle interior including another example of a plurality of heads-up displays, including displays provided on a vehicle windscreen and another vehicle component.
Figure 3B:
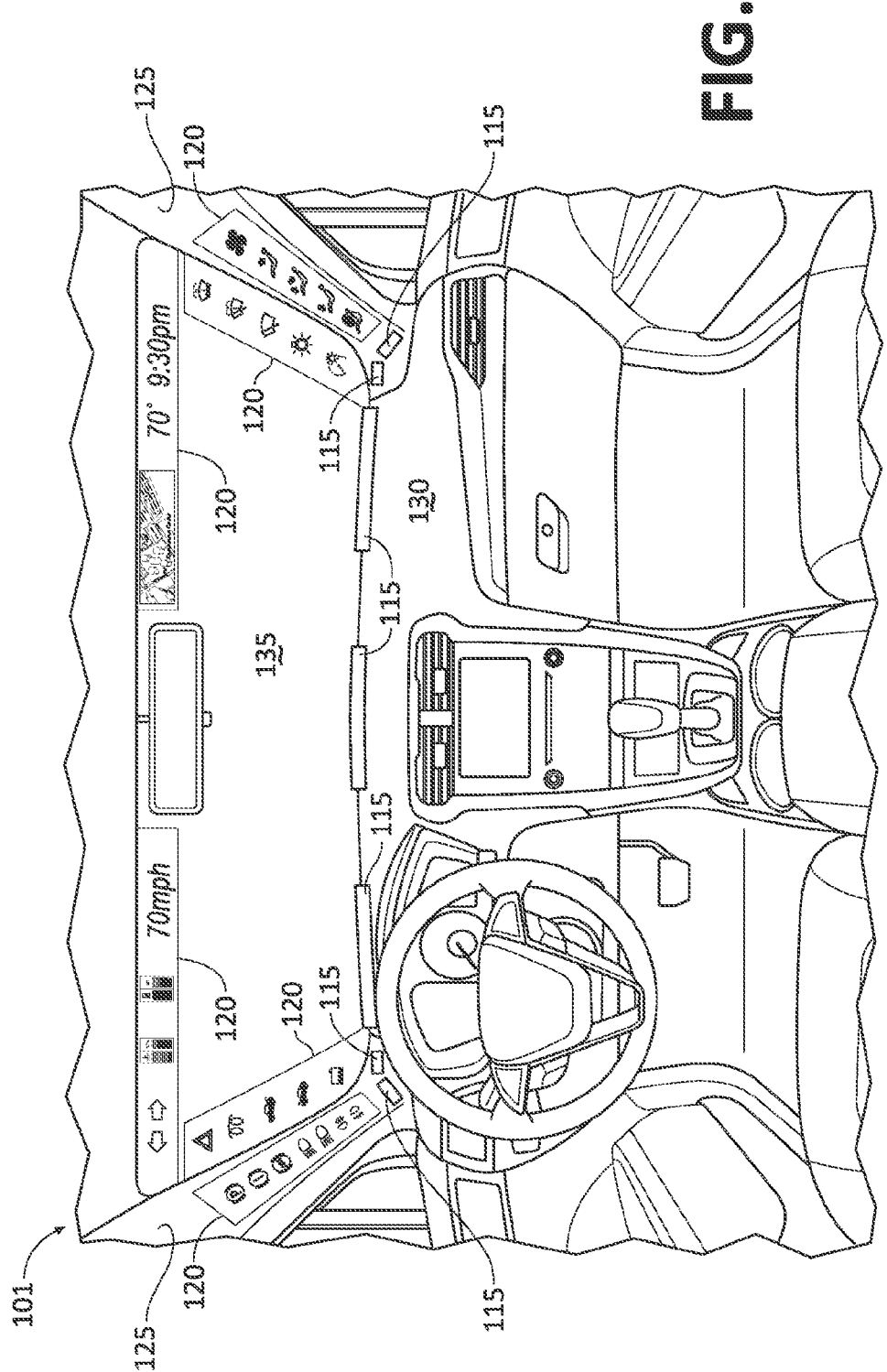
FIG. 3B is a perspective view of a front portion of a vehicle interior including another example of a plurality of heads-up displays, including displays provided on a vehicle windscreen and another vehicle component.

Further, as seen in FIGS. 3A and 3B, the display devices 115 may provide displays 120 on other vehicle 101 components, e.g., a vehicle pillar such as one or both A-pillars 125. Similarly, a display device 115 could be used provide a display 120 on a vehicle 101 interior or exterior mirror, instrument panel, etc. For example, as seen in FIGS. 3A and 3B, devices 115 could be located at respective bases of vehicle 101 A-pillars 125, whereby respective displays 120 could be projected on the respective pillars 125. Moreover, displays 120 could be provided at a bottom of a windscreen 135 (FIG. 3A) and/or at a top portion of a windscreen 135 (FIG. 3B).

Figure 4A:
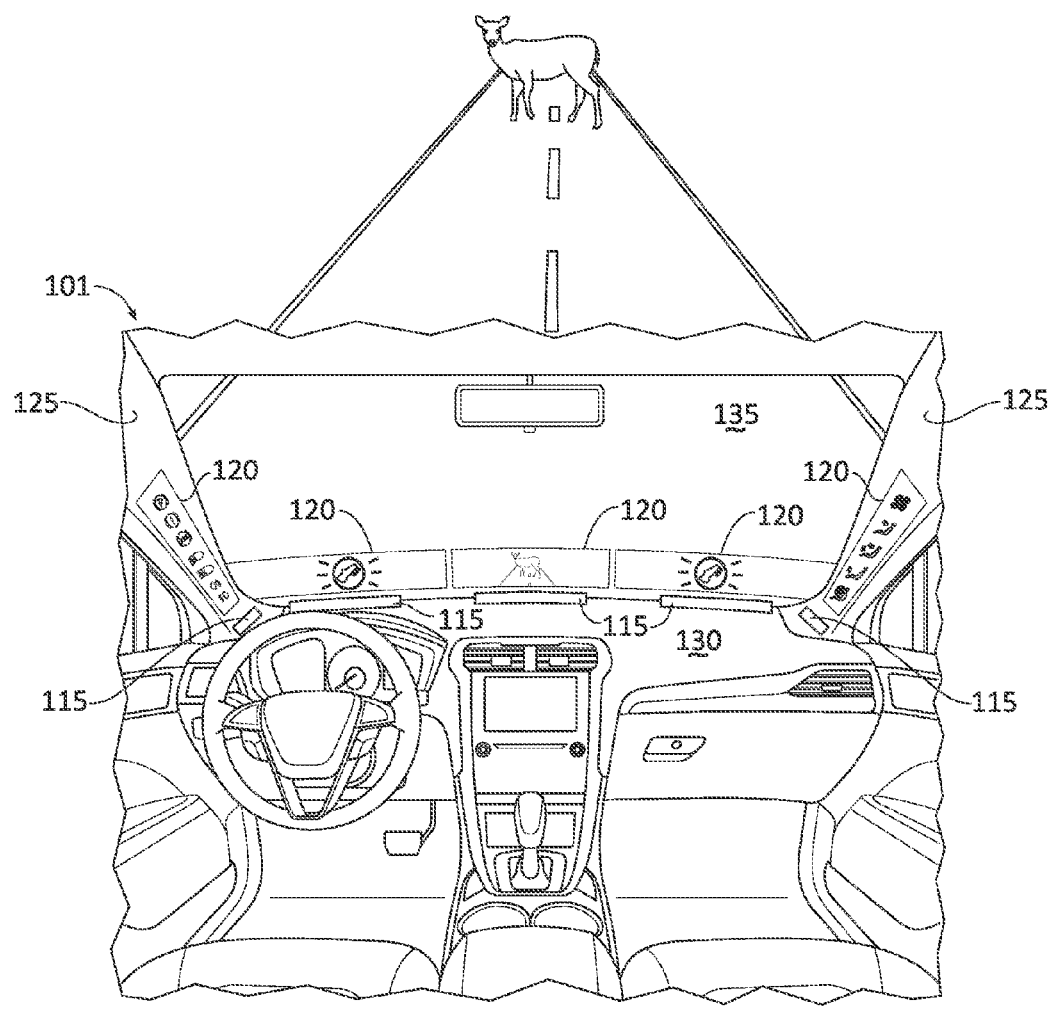
FIG. 4A is a perspective view of a front portion of a vehicle interior including an example of a plurality of heads-up displays, including displays provided exterior to a vehicle.
Figure 4B:
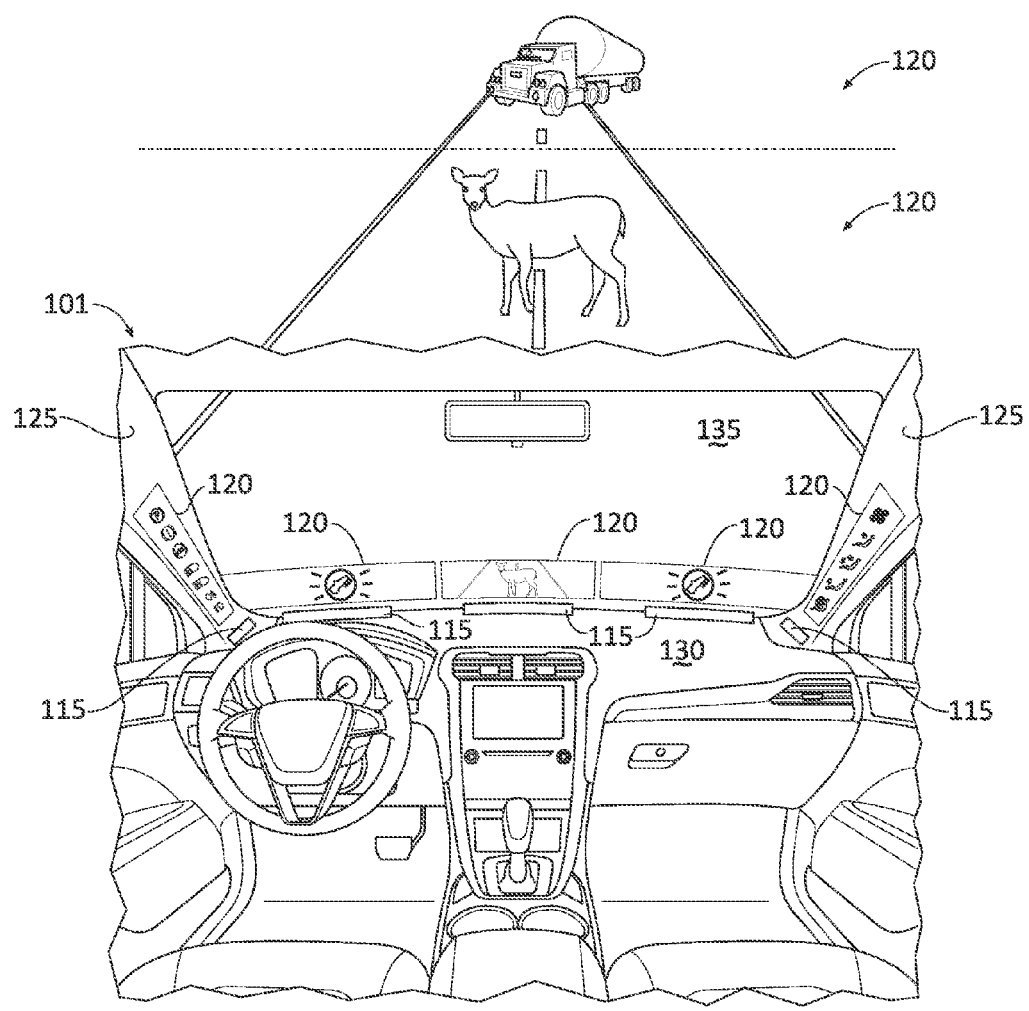
FIG. 4B is a perspective view of a front portion of a vehicle interior including another example of a plurality of heads-up displays, including displays provided exterior to a vehicle.

Yet further, as seen in FIGS. 4A and 4B, one or more display devices 115 could be used to provide a display 120 projected to appear over and/or beyond a vehicle 101 hood. For example, as seen in FIG. 4A, an image of an object, animal, etc. in a roadway with which a vehicle could potentially collide could be provided in a display 120, e.g., projected or superimposed on a vehicle 101 driver's view of the roadway. Further, as seen in FIG. 4B, multiple displays 120 could be provided with respect to a vehicle 101 exterior. For example, a first display 120 could be provided showing a first virtual image with a focus at a first distance, e.g., a first object such as the deer in a first display 120 could be shown at five meters. Further, a second display 120 could be provided showing a second virtual image with a focus at a second distance, e.g., a second object such as the tanker truck in the second display 120 could be shown at 10 meters. Moreover, arrangements of virtual displays 120 outside a vehicle other than as shown in FIGS. 4A and 4B are possible. For example, three or more displays 120 could be provided, such displays focusing on same or different depths and arranged in various ways, e.g., tiled, top-to-bottom, etc.

Figure 5:
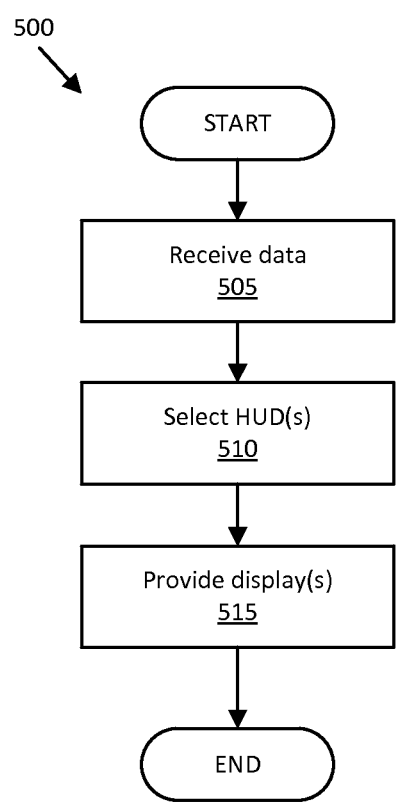
FIG. 5 is a flow diagram of a process for using the system of FIG. 1.

FIG. 5 is a flow diagram of an exemplary process 100 for using the system 100. The process 500 begins in a block 505, in which the computer 105 receives data 110, e.g., from various components in the vehicle 101, via the CAN bus or other mechanisms, etc.

Then, in a block 510, the computer 105 identifies a display device 115 for respective data 110. For example, a first display device 115 may be positioned on the vehicle dash 130 to provide a display 120 on a vehicle 101 pillar 125, whereas a second display device 115 could be positioned on the vehicle dash 130 to provide a display 120 on a vehicle 101 windscreen 135. Further, a particular display device 115 could be selected for a particular type of data 110. For example, image data 110 could be displayed on a right-hand side of the windscreen 135, whereas speed data 110 could be displayed on a lower left-hand corner of the windscreen 135, on and a pillar 125, on an end of a vehicle hood, etc.

Following the block 510, in a block 515, each of the one or more display devices 115 provided with data 110 in the block 510 provides a respective display 120.

Following the block 515, the process 500 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A heads-up display system, comprising:
a plurality of display devices; and
a computer programmed to receive data from one or more sources in a vehicle, and to provide the data to each of the display devices;
wherein at least one of the display devices is arranged to provide a first display on a vehicle pillar and at least one of the display devices is arranged to provide a second display on one of a vehicle instrument panel, a vehicle exterior, and a vehicle windscreen, whereby at least two displays are provided.

2. The system of claim 1, wherein one of displays provides image data, and one of the displays provides data from a vehicle controller or vehicle sensor.

3. The system of claim 1, wherein one of the displays is provided exterior to a vehicle that includes a virtual image superimposed on an external environment of the vehicle.

4. The system of claim 1, wherein the first display includes a first subset of the data and the second display includes a second subset of the data, wherein the first subset of the data and the second subset of the data have no data in common.

5. The system of claim 1, wherein one of the displays includes data relating to a status of at least one vehicle component, and another of the displays includes navigation data.

6. The system of claim 1, wherein at least one of the displays is mounted on a vehicle instrument panel.

7. A heads-up display system, comprising:
at least three display devices; and
a computer programmed to receive data from one or more sources in a vehicle, and to provide respective subsets of the data to each of the display devices;
wherein each of the display devices is arranged to provide a display at a respective location with respect to the vehicle, a first one of the locations being on a vehicle pillar, and a second one of the locations being on a component selected from the group consisting of a vehicle instrument panel, a vehicle exterior, and a vehicle windscreen.

8. The system of claim 7, wherein one of the displays is provided at a location exterior to a vehicle and includes a virtual image superimposed on an external environment of the vehicle.

9. The system of claim 7, wherein the first display includes a first subset of the data and the second display includes a second subset of the data, wherein the first subset of the data and the second subset of the data have no data in common.

10. The system of claim 7, wherein one of the displays includes data relating to a status of at least one vehicle component, and another of the displays includes navigation data.

11. The system of claim 7, wherein at least one of the displays is mounted on a vehicle instrument panel.

12. The system of claim 7, wherein the displays are tiled to extend for substantially an entire width of a vehicle windscreen.

13. A computing device that includes a processor and a memory, the memory storing instructions executable by the processor such that the computing device is programmed to:
receive data from one or more sources in a vehicle;
identify respective subsets of the data to be provided to respective ones of a plurality of display devices; and
provide the respective subsets of the data to the respective display devices according to respective locations of displays provided by the respective display devices, a first one of the locations being on a vehicle pillar, and a second one of the locations being on a component selected from the group consisting of one of a vehicle instrument panel, a vehicle exterior, and a vehicle windscreen.

14. The device of claim 13, wherein the device is installed in a vehicle.

15. The device of claim 13, wherein the device is communicatively coupled to the display devices.

16. The device of claim 13, wherein one of displays provides image data, and one of the displays provides data from a vehicle controller or vehicle sensor.

17. The device of claim 13, wherein one of the displays is provided exterior to a vehicle that includes a virtual image superimposed on an environment of the vehicle.

18. The device of claim 13, wherein the first display includes a first subset of the data and the second display includes a second subset of the data, wherein the first subset of the data and the second subset of the data have no data in common.

19. The device of claim 13, wherein one of the displays includes data relating to a status of at least one vehicle component, and another of the displays includes navigation data.

20. The device of claim 13, wherein at least one of the displays is mounted on a vehicle instrument panel.

* * * * *

UNITED STATES PATENT AND TRADEMARK OFFICE
CERTIFICATE OF CORRECTION

| | | |
|---|---|---|
| PATENT NO. | : 9,547,172 B2 | Page 1 of 1 |
| APPLICATION NO. | : 14/512575 | |
| DATED | : January 17, 2017 | |
| INVENTOR(S) | : Jeffrey Thomas Remillard, Anthony Gerald King and Jeff Allen Greenberg | |

It is certified that error appears in the above-identified patent and that said Letters Patent is hereby corrected as shown below:

In the Claims

Column 5, in Line 20, replace "one of displays" with -- one of the displays --.

Column 6, in Line 35, replace "one of displays" with -- one of the displays --.

Signed and Sealed this
Tenth Day of April, 2018

Andrei Iancu
*Director of the United States Patent and Trademark Office*